US012365568B2

(12) United States Patent
Granata

(10) Patent No.: US 12,365,568 B2
(45) Date of Patent: Jul. 22, 2025

(54) VEHICLE LIFT AND A METHOD FOR LIFTING VEHICLES

(71) Applicant: NEXION S.P.A., Correggio (IT)

(72) Inventor: Tebaldo Granata, Treglio (IT)

(73) Assignee: NEXION S.P.A., Correggio (IT)

( * ) Notice: Subject to any disclaimer, the term of this patent is extended or adjusted under 35 U.S.C. 154(b) by 0 days.

(21) Appl. No.: 18/404,291

(22) Filed: Jan. 4, 2024

(65) Prior Publication Data

US 2024/0228246 A1 Jul. 11, 2024

(30) Foreign Application Priority Data

Jan. 5, 2023 (IT) ........................ 102023000000078

(51) Int. Cl.
*B66F 7/06* (2006.01)
*B66F 7/08* (2006.01)

(52) U.S. Cl.
CPC .............. *B66F 7/0675* (2013.01); *B66F 7/08* (2013.01)

(58) Field of Classification Search
CPC .......... B66F 7/0691; B66F 7/08; B66F 7/065; B66F 7/0675
See application file for complete search history.

(56) References Cited

U.S. PATENT DOCUMENTS 4,858,888 A * 8/1989 Cruz ....................... B66F 7/065 254/122
4,901,980 A * 2/1990 Hansen ..................... B60P 1/02 254/90

(Continued)

FOREIGN PATENT DOCUMENTS

DE 102009002613 A1 * 11/2010 ............ B66F 7/0666
DE 102016122036 A1 * 6/2017

(Continued)

OTHER PUBLICATIONS

Search Report and Written Opinion from Italian Patent Application No. 102023000000078, Search completed Jul. 26, 2023, 7 pages.

*Primary Examiner* — Anna M Momper
*Assistant Examiner* — Michelle M Mudwilder
(74) *Attorney, Agent, or Firm* — Chrisman Gallo Tochtrop LLC

(57) ABSTRACT

This invention relates to vehicle lift which comprises:
a platform (2)
to support a vehicle,
two scissor-like structures (4) for supporting the platform (2), each provided with one first leg (5*a*) which can rest on the ground (S) and with a second leg (5*b*) which can rotate about a main axis (A) of rotation, and respective apparatuses (7) for the synchronous movement of the structures (4), each of them being configured for the relative rotation of the legs (5*a*, 5*b*) about the main axis (A) and for the consequent upward or downward movement of the platform (2), which is kept parallel to the ground (S), and comprises a linear actuator (8), for moving a kinematic system (9) coupled to the legs (5*a*, 5*b*). The kinematic system (9) comprises:
a first auxiliary lever (10*a*), articulated with a first end portion of it to the second leg (5*b*) and with a second end portion of it, opposite the first, to a second auxiliary lever (10*b*), articulated at the opposite end to a slider (11) which can slide by virtue of the action of the actuator (8) along a track (2*a*) which is integral with the platform (2),
a first connecting lever (12*a*), articulated to the first leg (5*a*) and to a second connecting lever (12*b*), articulated at the opposite end to a sliding element, (13) which can slide in a guiding slot (14) provided along the slider (11).

15 Claims, 10 Drawing Sheets

(56) References Cited

U.S. PATENT DOCUMENTS

| | | | | | |
|---|---|---|---|---|---|
| 5,024,141 | A * | 6/1991 | Kawada | B66F 7/28 | 324/207.13 |
| 5,460,460 | A * | 10/1995 | Alexander | B66F 7/08 | 14/71.3 |
| 5,967,494 | A * | 10/1999 | Fiorese | B66F 7/065 | 254/122 |
| 8,286,944 | B2 * | 10/2012 | Rossato | B66F 7/0666 | 254/122 |
| 8,672,297 | B2 * | 3/2014 | Schmitt | B66F 7/0666 | 254/128 |
| 9,145,284 | B2 * | 9/2015 | Finkbeiner | B66F 7/28 | |
| 2009/0078509 | A1 * | 3/2009 | Olsen | B66F 7/065 | 414/800 |

FOREIGN PATENT DOCUMENTS

| | | | | |
|---|---|---|---|---|
| EP | 1447372 | A2 * | 8/2004 | B66F 3/22 |
| JP | H09278391 | A | 10/1997 | |
| KR | 101666419 | B1 * | 10/2016 | |
| WO | WO-2011032872 | A1 * | 3/2011 | B66F 7/0633 |
| WO | WO-2011098209 | A1 * | 8/2011 | B66F 7/065 |
| WO | 2017021863 | A1 | 2/2017 | |
| WO | 2022137044 | A1 | 6/2022 | |

* cited by examiner

VEHICLE LIFT AND A METHOD FOR LIFTING VEHICLES

This invention relates to a vehicle lift and a method for lifting vehicles. Vehicle lifts are devices widely used in garages and other workshops, where they are useful for carrying out inspections, assembly work, repairs and maintenance on motor cars (as well as other vehicles). The lift allows the car to be raised off the ground so that the operator can conveniently work underneath it and has easy access to parts of the car that would otherwise be difficult to reach.

In a general configuration well-established in the trade, a vehicle lift comprises two elongated platforms which directly support the vehicle from below and which can be raised and lowered while remaining side by side and parallel to the ground.

Each platform is moved by a scissor-like structure, which comprises a first pair of mutually articulated legs, supporting a first end of the platform, and a second pair of mutually articulated legs mirror symmetric to the first pair and supporting the other end.

Operatively interposed between the two legs of each pair is the part which is responsible for moving the lift and which comprises or consists of a thrust cylinder: a first end of the cylinder is articulated to one leg, while on the other side, the free end of its movable stem is articulated to the other leg.

Examples of lifts are provided by the patent documents WO2022/137044A1, WO2017/021863A1, JPH09278391A.

These constructional solutions are not free of disadvantages, however. First of all, it should indeed be noted that to provide the thrust cylinder with the necessary space, in particular in the fully lowered configuration in which the legs are collapsed and the platform is close to the ground, the components involved must be oversized, which in turn means more space occupied, higher cost of components and the need for larger ramps to allow a vehicle to be driven onto and off the lift.

Another well-known disadvantage of vehicle lifts lies in the difficulty of adequately protecting the thrust cylinder from dust, dirt and contaminating particles in general, which are found in abundance in garages, coachbuilders' workshops and/or production and assembly lines where vehicle lifts are typically used.

Moreover, it should also be noted that, as in other sectors, there is a strongly felt need to reduce the energy consumption of the vehicle lift, with a view to reducing costs and in the more general context of soaring costs of energy supplies.

The main purpose of this disclosure is to overcome the above-mentioned drawbacks by providing e vehicle lift that is more compact and has a smaller footprint than those of prior art solutions.

In the context of this purpose, one aim of this disclosure is to provide a lift that allows vehicles of different kinds to be effectively lifted with a lower power requirement than traditional solutions.

Another aim of the disclosure is to provide a lift which affords effective protection to the mechanisms responsible for generating the lifting force. Another aim of the disclosure is to provide a lift which allows limiting the size of the legs responsible for lifting the platform, hence of the up/down ramps.

Another aim of the disclosure is to provide a lift which ensures a high level of operational reliability.

Another aim of the disclosure is to propose a lift whose technical and structural architecture is alternative to those of vehicle lifts known in the prior art.

Yet another aim of the disclosure is to provide a lift that can be easily made from components and materials readily available on the market.

A yet further aim of the disclosure is to provide a lift that is inexpensive and can be safely applied.

The above purpose and these and other aims that will become apparent below are achieved by a lift and the method for lifting according to one or more of the claims below.

So, the invention provides a vehicle lift, comprising a platform configured to support a vehicle. The lift includes support structures for the platform; in particular, the lift includes (at least) two support structures for the platform. At least one of these support structures (preferably both) is a scissor structure; alternatively, it could be a column structure, for example, equipped with a hydraulic jack or a rack.

In the preferred case where each (or at least one) support structure for the platform is a scissor structure, it includes a first leg, which can rest on the ground, and a second leg articulated to the first leg. For example, the second leg is rotatable relative to the first leg around a main axis of rotation passing through a common end of the first and second legs.

The lift also includes a movement system for the support structures; preferably, this system is a synchronous movement system of the support structures. The movement system may include a plurality of movement apparatuses. Preferably, the lift includes, for the support structures, respective synchronous movement devices for the support structures themselves.

Each of these apparatuses is configured to perform a relative rotation of said first and second legs around said main axis; in this way, the device determines a consequent upward or downward movement of said platform; the fact that the movement is synchronous ensures that the platform is kept parallel to the ground during its movement.

In one example, at least one of these apparatuses (preferably both) includes a linear actuator; for example, the linear actuator is supported by the platform (alternatively, it could be associated with the arms).

In one example, at least one of these devices (preferably both) includes a kinematic system connected to the respective legs (the first and the second leg). The linear actuator is configured for the movement of the kinematic system.

The kinematic system may include a first auxiliary lever and a second auxiliary lever. Furthermore, the kinematic system may include a slider, sliding along a track, for example, a track integral with the platform. According to one embodiment, the first auxiliary lever is articulated to the second leg, through a first end portion of the first auxiliary lever itself; the first auxiliary lever can be articulated to the second auxiliary lever, through a second end portion of the first auxiliary lever itself (opposite to the first end portion).

The second auxiliary lever can be articulated (for example, at the opposite end to that articulated to the first auxiliary lever) to the slider. For example, the slide is movable by the action of the actuator along the rail.

In one example, the kinematic system also includes a first connecting lever and a second connecting lever. Furthermore, the kinematic system may include a sliding element coupled to the slider (preferably, the sliding element coupled to the slider to slide relative to it).

The first connecting lever can be articulated to the first leg, for example, through a first end portion of the first connecting lever itself. The first connecting lever can be articulated to the second connecting lever, through a second end portion (opposite to said first end portion) of the first connecting lever itself.

The second connecting lever can be articulated (for example, on the opposite side to the side articulated to the first connecting lever) to the slider. For example, the slider is slidable in a guiding slot provided along the slider.

The present invention also provides a method for lifting vehicles using a platform; the platform is configured to support a vehicle.

The method involves providing support structures for the platform; in particular, (at least) two support structures for the platform. At least one of these support structures (preferably both) is a scissor-like structure; alternatively, it could be a column structure, for example, equipped with a hydraulic jack or a rack.

In the preferred case, where each (or at least one) support structure for the platform is a scissor-like structure, it includes a first leg, supportable on the ground, and a second leg articulated to the first leg. For example, the second leg is routable relative to the first leg around a main axis of rotation passing through a common end of the first and second legs.

The method also involves providing a movement system for the support structures; preferably, this system is a synchronous movement system of the support structures. The movement system may include a plurality of movement devices. Preferably, the method involves providing, for the support structures, respective synchronous movement devices for the support structures themselves.

The method involves performing, through these devices, a relative rotation of said first and second legs around the main axis, so that the platform moves vertically while remaining parallel to itself and to the ground.

The method may also include a phase of movement of a kinematic system constrained to said legs.

Preferably, the kinematic system is moved by a linear actuator, which, in one example, is supported by the platform. For example, the kinematic system is as described above.

In one example, the kinematic system includes a lever system (for example, as described above), and the linear actuator moves a slider, sliding along the platform, wherein the slider includes a guiding slot along which a lever of the lever system is constrained to slide (for example through a sliding element).

Further features and advantages of the disclosure are more apparent in the description of a preferred but non-exclusive embodiment of the lift according to the disclosure, illustrated by way of non-limiting example in the accompanying drawings, in which.

Figure 1:
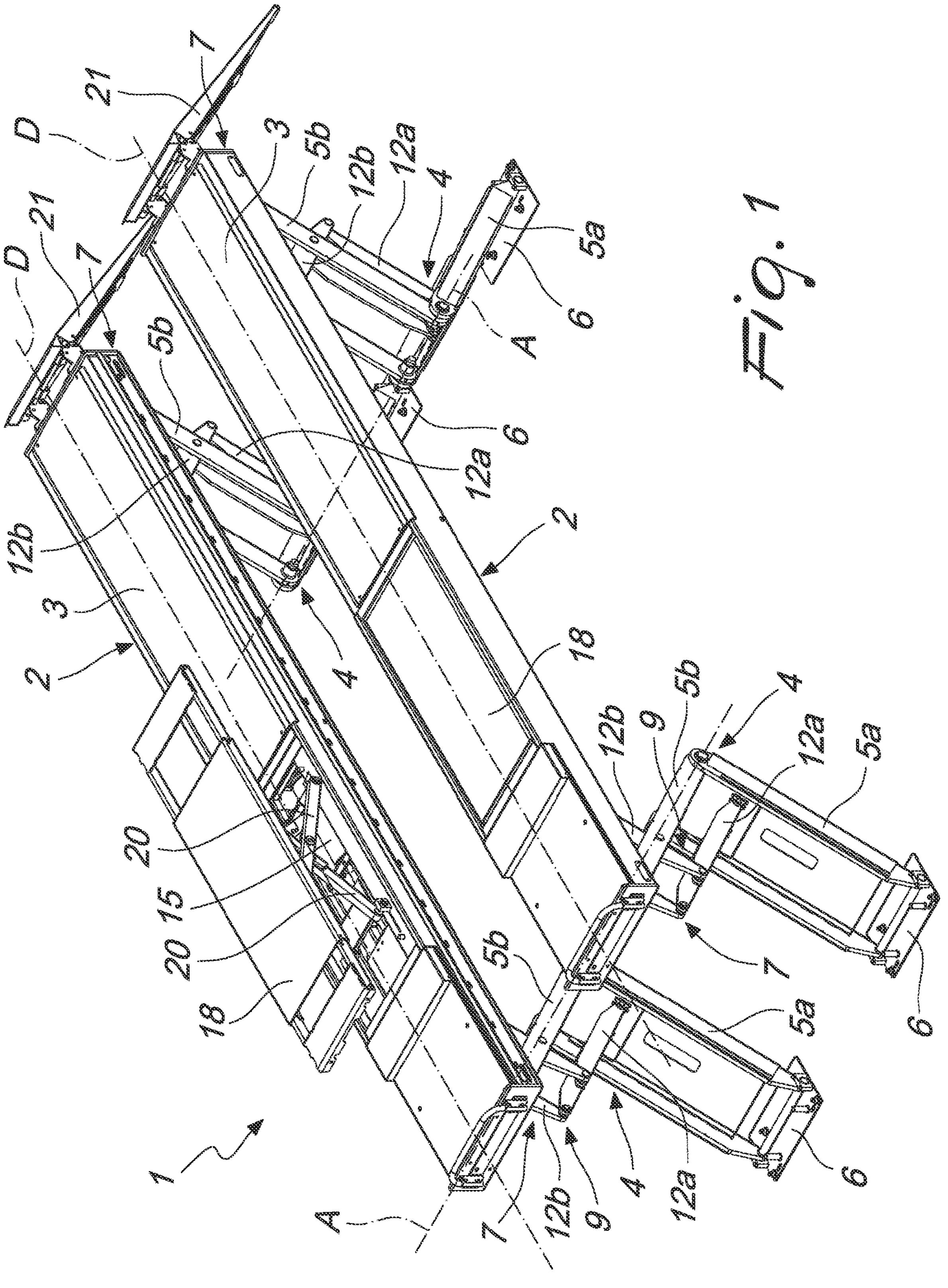
FIG. 1 shows the lift according to the disclosure in an axonometric view.
Figure 2:
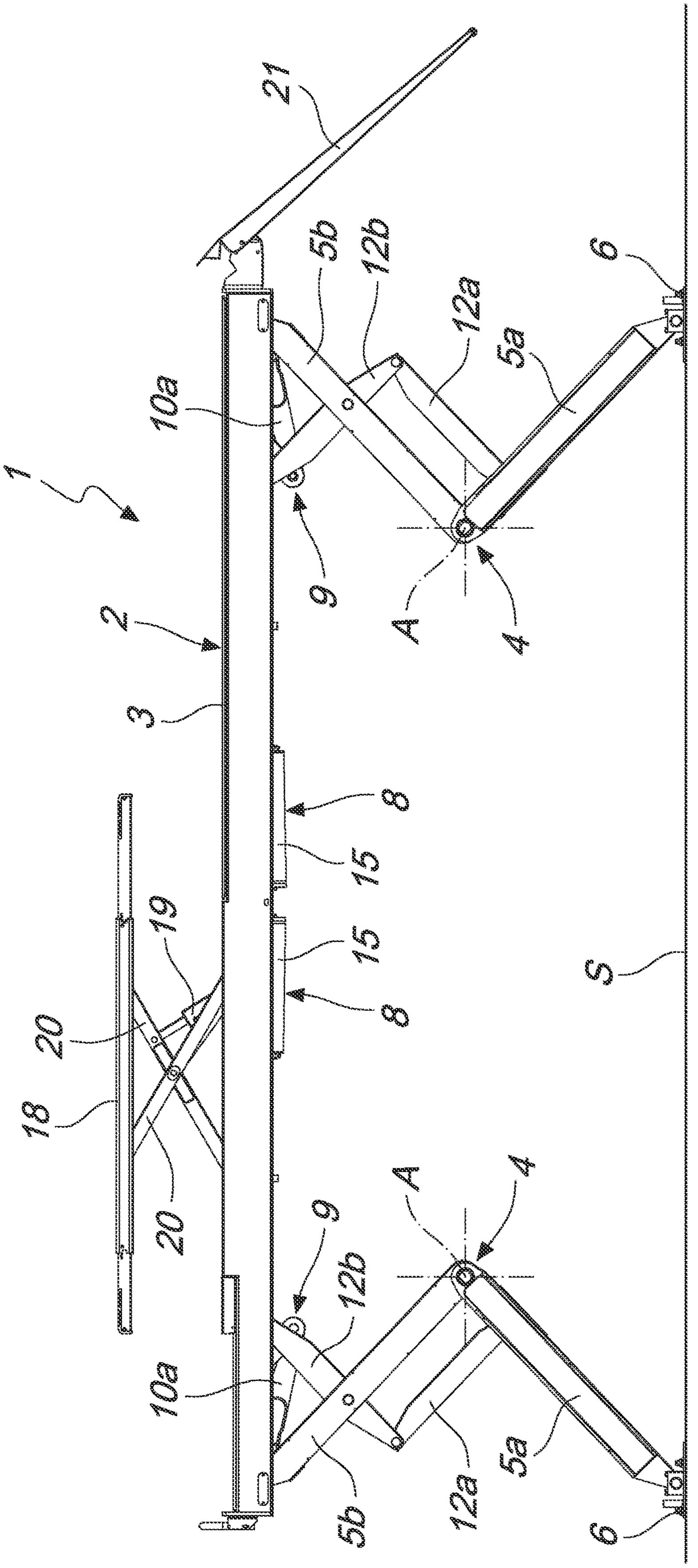
FIG. 2 illustrates the lift of FIG. 1 in a side elevation view.
Figure 3:
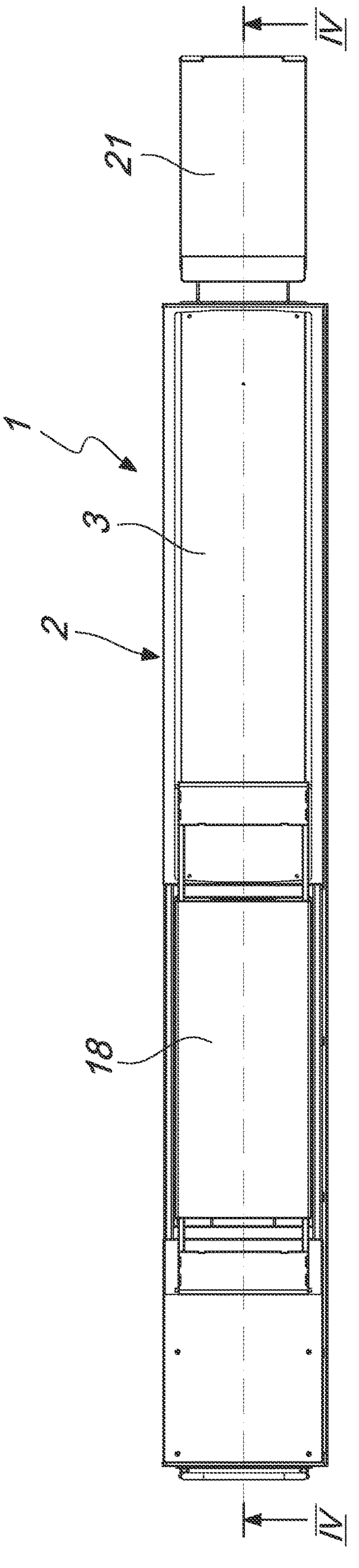
Figure 4:
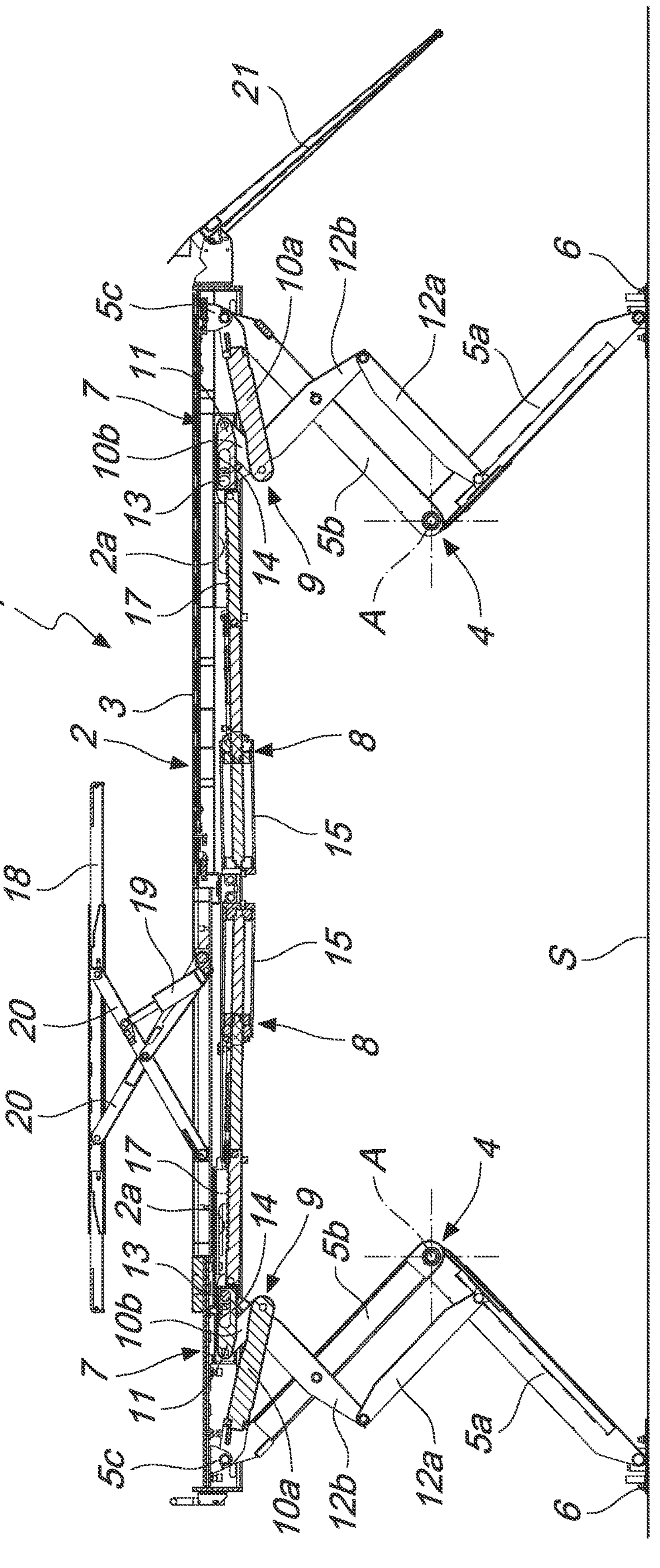
Figure 5:
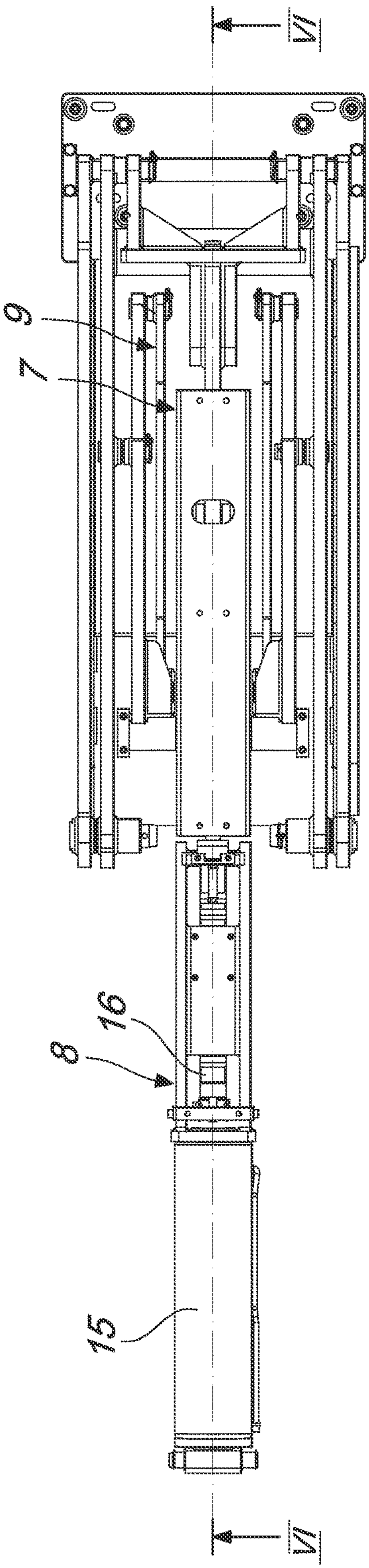
Figure 6:
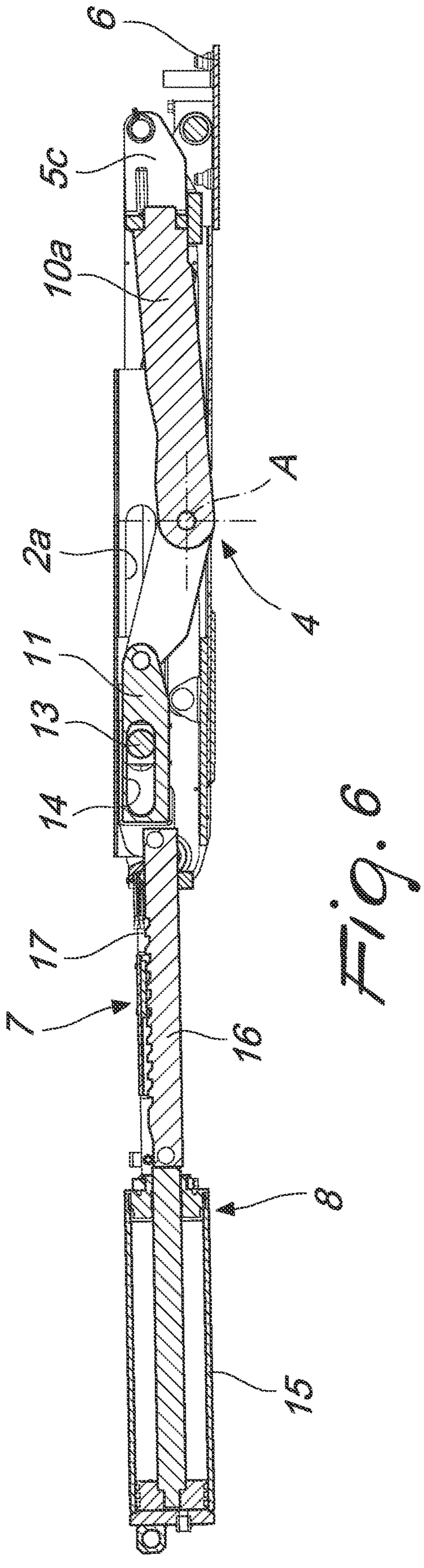
Figure 7:
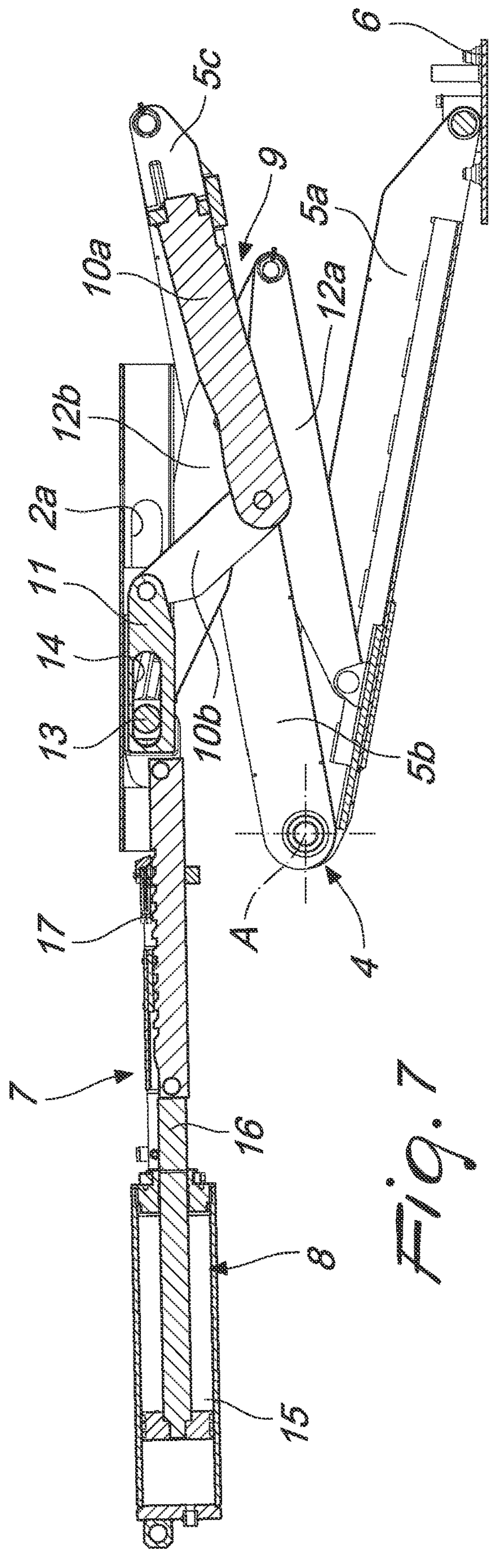
Figure 8:
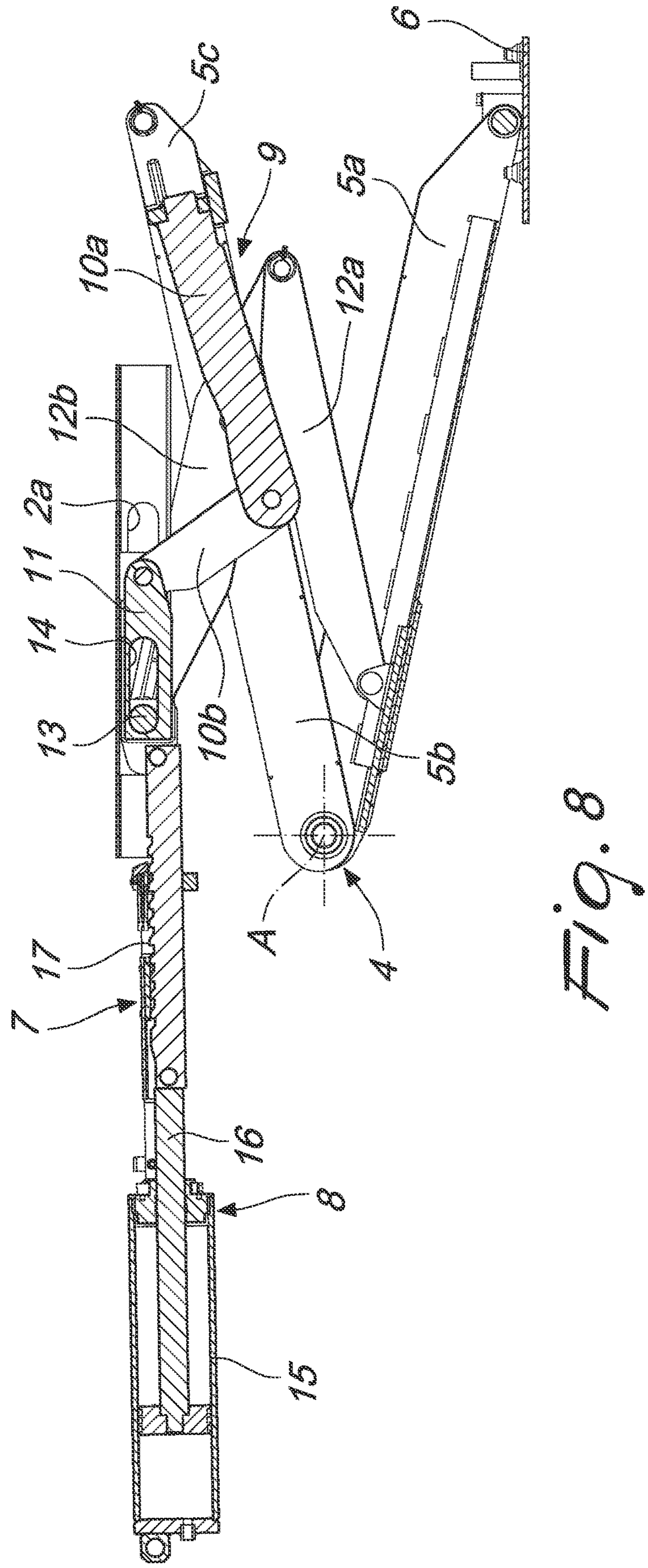
Figure 11:
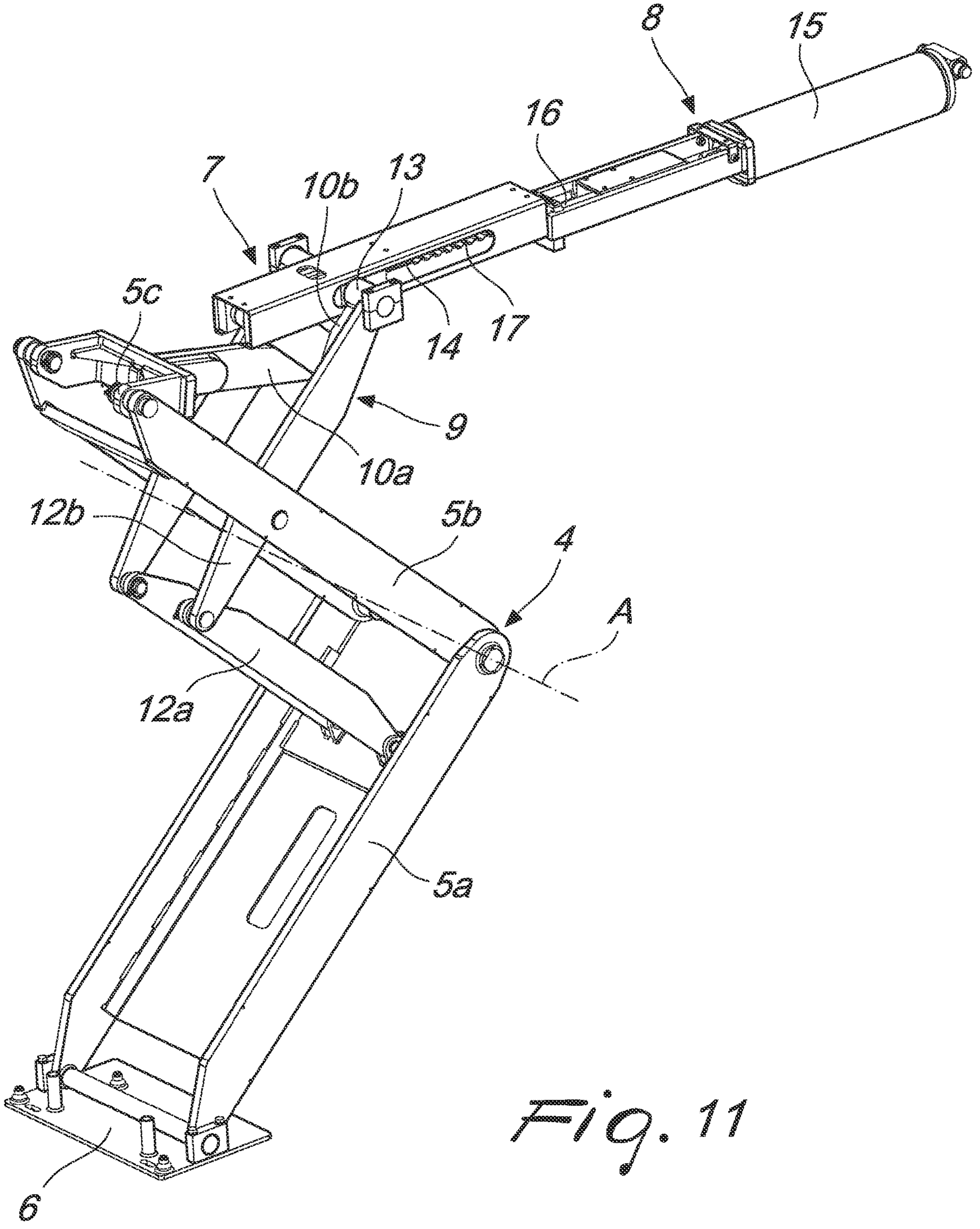

FIG. 3 illustrates one of the platforms of the lift of FIG. 1, viewed from above, FIG. 4 is a cross section of FIG. 3, through the axis IV-IV, FIG. 5 shows a sub-unit of the lift of FIG. 1, viewed from above and in a collapsed position, flat on the ground, FIG. 6 is a cross section of FIG. 5, through the axis VI-VI, FIGS. 7 to 10 show the cross section of FIG. 6 at successive instants of the lifting movement of the platform, FIG. 11 illustrates a scissor-like structure and the respective apparatus for moving the lift of FIG. 1, in an axonometric view.

With reference in particular to the drawings listed above, the reference numeral 1 denotes in its entirety a vehicle lift.

As will become clear in the description that follows, in the preferred embodiment shown in the accompanying drawings, the lift 1 is typically used for lifting motor cars or other vehicles with four wheels (or more). The scope of protection claimed herein nevertheless extends to the use of the lift 1 (in the embodiment illustrated or in other embodiments) for lifting motorcycles or even other vehicles, depending on specific requirements. The lift 1 comprises at least one platform 2 configured to support a vehicle. More in detail, the platform 2 may comprise or consist of a section bar 3 or other suitably solid component whose top surface has a pavement-like finish defining a supporting surface for the vehicle.

As shown in the accompanying drawings, the platform 2, viewed from above, typically has an elongated (preferably rectangular) shape with a predominant dimension (the horizontal, longitudinal direction D which, for simplicity, is shown only in FIG. 1), the same that is followed by the vehicles when, on one side, they are loaded onto the platform 2 itself.

The lift 1 also comprises two scissor-like structures 4 for supporting the platform 2 (even indirectly) and typically disposed on opposite sides or end portions of the platform.

Each structure 4 comprises (in essentially known manner) at least one first leg **5*a* which can rest on the ground S and a second leg 5*b* which can rotate with respect to the first leg 5*a*** about a main axis A of rotation that passes through a common end.

On the side opposite the common end, the second end **5*c* of the second leg 5*b* is articulated to the platform 2 so as to be able to support it. On the side opposite the second leg 5*b*, the first leg 5*a* may be articulated to a base 6** affording a stable support on the ground S.

The lift 1 also at least comprises respective apparatuses 7 (typically mirror symmetric) for the synchronous movement of the structures 4, each apparatus 7 being configured to impart relative rotation to the legs **5*a*, 5*b* about the main axis A, thereby moving the platform 2 up or down while keeping it parallel to the ground S (obviously when the platform 2, in use, rests with its first legs 5*a*** on the ground S).

By synchronous movement is meant that the relative rotational movements imparted by the two apparatuses 7 to the respective legs **5*a*, 5*b* are equal in quantity and opposite in direction, so that the upward or downward stroke (on opposite sides of the platform 2 are equal in quantity so as to keep the platform 2 itself, and the pavement 3**, in particular horizontal (parallel to the ground).

According to the disclosure, the apparatuses 7 each comprise at least one linear actuator 8, which is supported by the platform 2 and is configured for moving a kinematic system 9 coupled to the legs **5*a*, 5*b***.

The kinematic system 9. first of all, in turn comprises at least a first auxiliary lever **10*a* and a second auxiliary lever 10*b*. The first auxiliary lever 10*a* is articulated with a first end portion of it to the second leg 5*b* (preferably at the second end 5*c*) and with a second end portion of it, opposite the first end portion, to the second auxiliary lever 10*b***.

The second auxiliary lever **10*b* is in turn articulated, at the end opposite the first auxiliary lever 10*a*, to a slider 11 which can slide along a track 2*a* made along the platform 2 by virtue of the action of the actuator 8. The track 2*a* causes the slider 11 to slide along the predominant dimension (along the longitudinal direction D). As may be inferred from the accompanying drawings, the track 2*a* may consist of an elongated slot-like feature made along the respective platform 2**.

According to the disclosure, the kinematic system 9 also comprises at least a first connecting lever 12*a* and a second connecting lever 12*b*. The first connecting lever 12*a* is articulated with a first end portion of it to the first leg 5*a* and with a second end portion of it, opposite the first end portion, to the second connecting lever 12*b*. At the end opposite the first connecting lever 12*a*, the second connecting lever 12*b* is in turn articulated to a sliding element, 13 which can slide in a guiding slot 14 made along the slider 11.

The slot 14 allows the slider 13 to slide along the predominant dimension (along the longitudinal direction D).

Preferably, the connecting levers 12*a*, 12*b* and the legs 5*a*, 5*b* together form an articulated parallelogram.

It is specified that the levers 10*a*, 10*b*, 12*a*, 12*b* (as well as the legs 5*a*, 5*b*) may be made in any way and from any material which an expert in the field would consider suitable for the purpose: in particular, each of them may comprise or consist of one or more beams, rods or plates, variously shaped according to specific requirements, without thereby departing from the scope of the protection claimed herein.

In a first embodiment of the invention, the lift 1 comprises only one platform 2, thus being particularly suitable for lifting two-wheeled motor vehicles.

In the preferred embodiment, illustrated in the accompanying drawings by way of a non-limiting example of the application of the invention, the lift 1 comprises two platforms 2. That makes the lift 1 particularly suitable for lifting motor cars or other 4-wheeled vehicles or even heavier, more cumbersome vehicles.

The two platforms 2 are preferably elongated along respective, mutually parallel longitudinal directions D and are kept (horizontal) at the same vertical elevation at all times. In other words, the respective apparatuses 7 are configured in such a way that the relative rotation of the legs 5*a*, 5*b* imparted by them is coordinated in such a way that the upward or downward movement of the two platforms 2 is performed according to the same laws of motion: for example, starting from an initial condition where the platforms 2 are both substantially resting on the ground, they remain, as required, at the same vertical elevation at any time during their operation. The rest of this description provides a practical example of how this aim is achieved.

It is understood that there may be more than two platforms 2 without thereby departing from the scope of the protection claimed herein.

Usefully, but without excluding other practical solutions, each linear actuator 8 comprises a cylinder 15 anchored to the respective platform 2 (which rigidly supports it) and a stem 16 capable of relative translation (along the longitudinal direction D) relative to the cylinder 15, for moving the slider 11 (hence of the other components of the kinematic system 9). More particularly, in the preferred embodiment, the cylinder 15 is a hydraulic cylinder.

Advantageously, the hydraulic cylinder 15 of a first actuator 8 of one of the platforms 2 is operatively associated, according to a master-slave logic, with the cylinder 15 of a first actuator 8 of the other of the platforms 2, and vice versa.

As is known, the "master-slave" logic indicates a mode of connecting the hydraulic cylinders 15 whereby moving the stem 16 of one of them is controlled by the movement of the other so that their movements are synchronized.

This ensures that the movement of the two platforms 2 is coordinated. Positively, each actuator 8 comprises a safety rack 17 interposed between the stem 16 and the respective slider 11. The rack 17 is responsible for preventing the slider 11 from accidentally moving.

Usefully, the lift 1 may also comprise at least one auxiliary deck 18, supported by the platform 2 and movable between a first inactive configuration, in which it lies on the supporting surface identified by the platform 2, and at least one second configuration, in which it is raised from the platform 2 in a parallel arrangement so as to constitute an additional, raised support.

In FIG. 1, the deck 18 of the platform 2 lower down and on the right is positioned in the first configuration, while the deck 18 of the platform 2 higher up and on the left is positioned in the second configuration.

In particular, the lift 1 comprises scissor-like means for lifting the deck 18, in turn comprising a device 19 for moving a pair of mutually articulated arms 20 rotatably interposed between the platform 2 and the deck 18. The device 19 may comprise a hydraulic or other kind of piston.

The lift according to this disclosure works as follows.

To raise each platform 2 (from an initial position in which is substantially resting on the ground and the lift 1 occupies the minimum space with all its components fully collapsed), its actuators 8 must be activated simultaneously to cause the sliders 11 to move outwards in translation (along the longitudinal direction D). In particular, in the preferred embodiment, the movement of the slider 11 is preferably imparted by stems 16 which are pushed progressively out of hydraulic cylinders 15. The movements of the two actuators 8 and of the respective kinematic systems 9 of the same platform 2 are mirror symmetric: described below is the movement of only one of the actuators 8 and of the respective kinematic system 9, that of the others (belonging to the same platform 2 and/or of any others the lift 1 may be provided with) being clearly inferable therefrom.

At the initial position, the platform is substantially resting on the ground S or, in any case, at a minimum distance therefrom: the actuator 8 and the kinematic system 9 are in the condition shown, for example, in FIG. 6. Thanks to suitable sizing and, as may be clearly inferred from FIG. 6, the sliding element 13 is spaced from the border of the slot 14 facing towards the corresponding cylinder 15. Thus, in the first stretch of the stroke of the actuator 8 (FIG. 7), the slider 11 (guided by the track 2*a*) in turn moves and causes the second auxiliary lever 10*b* to rotate, while the slider 13 can move with relative motion within the slot 14 towards the aforesaid border. The rotation of the second auxiliary lever 10*b* causes the first auxiliary lever 10*a* to move, hence the second leg 5*b* to rotate: more in detail, both of the legs 5*a*, 5*b* start rotating about the main axis A, the second end 5*c* of the second leg 5*b* moves upwards and the platform 2 starts being raised, supported by the legs 5*a*, 5*b*.

Figure 9:
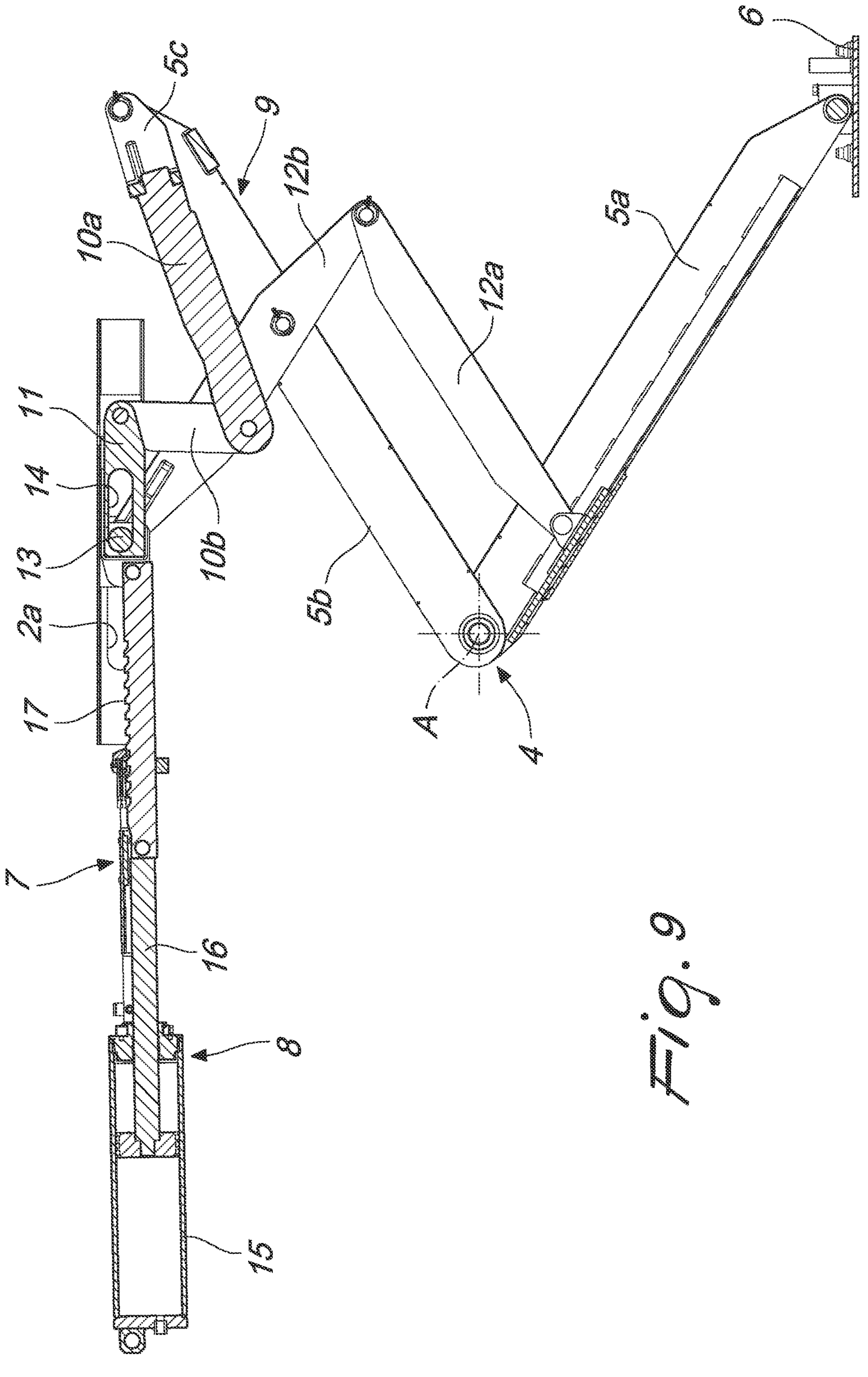
Figure 10:
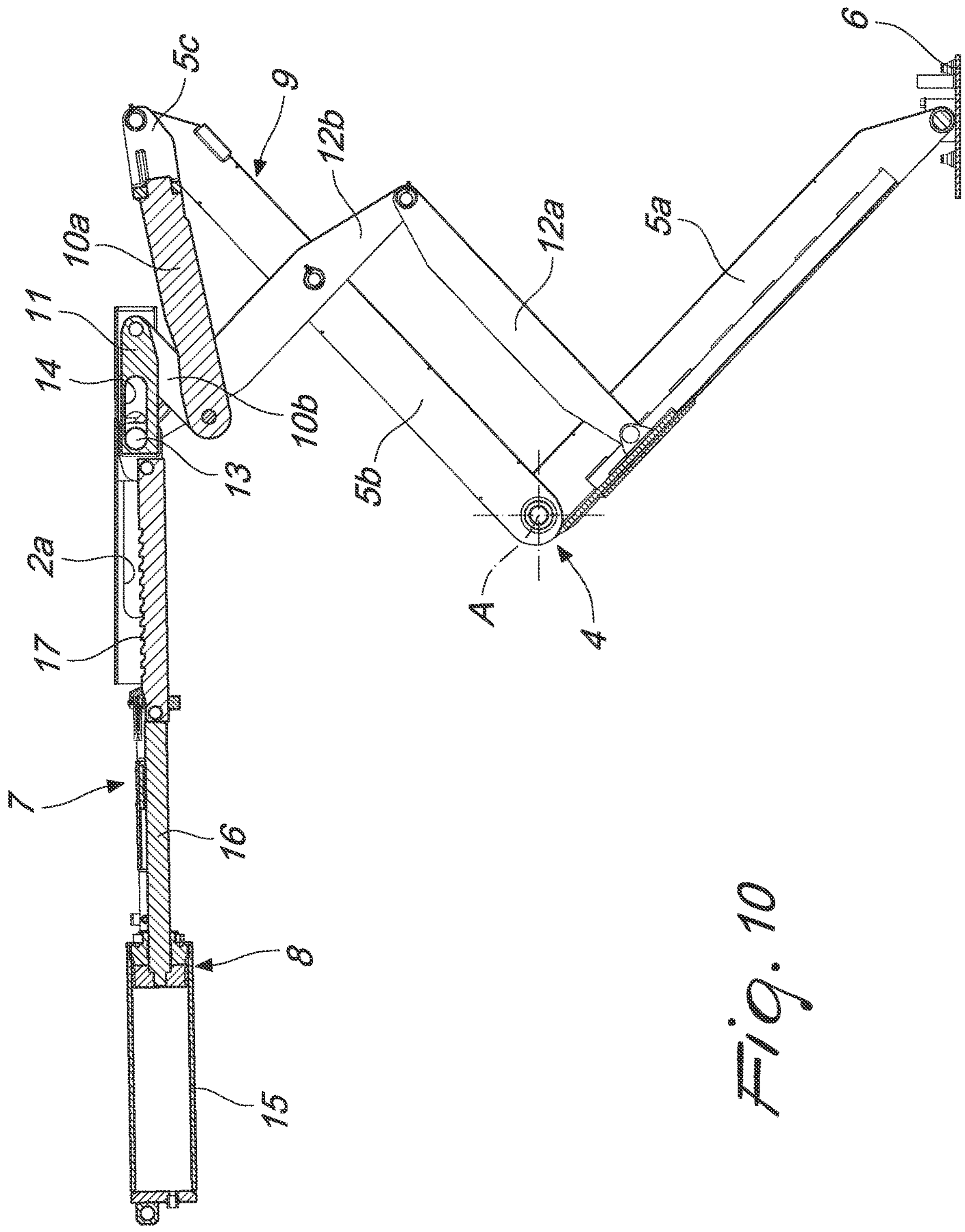

After a first stretch of stroke of the actuator 8 and the consequent movement of the slot 14 relative to the sliding element 13 inside it, the sliding element abuts against the aforesaid border of the slot 14 (FIG. 8): the actuator 8 continues moving in translation, thereby pushing the slider 11 further (still guided by the track 2*a*), but since any relative translation between sliding element 13 and slot 14 is now prevented, the slider 11 (on which the slot 14 is made) entrains the sliding element 13 along with it, in turn causing the second connecting lever 12*b* to rotate (FIG. 9).

The rotation of the second connecting lever 12*b* causes the first connecting lever 12*a* to move: this constrains the legs 5*a*, 5*b* to continue their relative rotation about the main axis A, and thus the second end 5*c* of the second leg 5*b* continues rising, lifting the platform 2 to the desired vertical elevation or to the end of the stroke of the slider 11 (FIG. 10), for example constrained by the track 2*a*.

The lowering of the platform 2 obviously occurs by moving the actuator 8 and the kinematic mechanism 9 in the opposite direction.

As stated above, the rack 17 makes the lift 1 safe, while the deck 18 allows obtaining an auxiliary support, useful in some circumstances.

In a totally distinct and innovative manner, therefore, the part responsible for moving the scissor-like structure 4 (the cylinder 15 or other linear actuator 8) is not located between the legs 5*a*, 5*b*, as in prior art solutions, but on the platform 2 and preferably just under it. The zone between the legs 5*a*, 5*b* is completely free and no oversizing is necessary to find a place for cumbersome components, as is the case in prior art solutions (thanks to suitable sizing, the connecting levers 12*a*, 12*b* can in practice be contained in the space between the legs 5*a*, 5*b* in the collapsed position).

It should also be noted that lifting (which appears uninterrupted to an observer) is in practice obtained through two different movements of the kinematic system 9 which are activated automatically in the first and the second part of the lifting stroke.

This is particularly relevant because in the first stage (with the lift 1 in the collapsed condition) the movement of the legs 5*a*, 5*b* is carried out via the auxiliary levers 10*a*, 10*b* and both these and the connecting levers 12*a*, 12*b* act as force reducers and supports for the actuator 8. This ensures a sufficient lifting start force, certainly sufficient for the different vehicles that can be supported by the platform/platforms 2.

In a second stage (when the platform 2 has already been lifted partially off the ground S), rotation is controlled by the movement of the connecting levers 12*a*, 12*b*.

More generally speaking, the lift of this disclosure requires less effort than traditional solutions for lifting operations, while at the same time providing more protection for the cylinders 15 or, in any case, for the actuators 8, which are mounted on the platform 2 which can effectively protect them against dust, dirt and contaminating particles in general.

Since there is no need to make space for the actuator 8 between the legs 5*a*, 5*b*, as would be the case in a traditional arrangement, the overall dimensions and size of the legs 5*a*, 5*b* and of the other components involved can be more limited and made more compact. In particular, the overall height of the lift 1 can be reduced compared to prior art solutions (when collapsed, occupying the minimum amount of space, the height of the lift 1 may be less than 250 mm and, for example, it may be 220 mm). This also allows limiting the dimensions of the ramps 21 which are rested against one side of the platforms 2 when the vehicle needs to driven onto or off the lift. The limited size also means that the lift 1 needs less shop floor space compared to prior art solutions, which translates as further, evident advantages.

As we have seen, the master/slave logic with which the cylinders 15 of the two platforms 2 can be associated ensures perfect alignment.

In practice, it was found that the lift according to this invention fully achieves the intended purpose, in that the use of an actuator 8 which is supported directly by the platform 2 and acts on a specific kinematic system 9 responsible for moving the legs 5*a*, 5*b* allows making a vehicle lift 1 that is more compact and occupies less space than prior art solutions. The invention described above may be modified and adapted in several ways without thereby departing from the scope of the inventive concept; moreover, all the details of the invention may be replaced by technically equivalent elements.

In the embodiments illustrated, single features described in connection with specific examples could in fact be replaced by other, different features existing in other example embodiments.

In practice, the lift of the invention may be made from any materials and in any size, according to requirements and the state of the art.

The invention claimed is:

1. A vehicle lift, comprising at least:

a platform configured to support a vehicle, two scissor-like structures for supporting said platform, each comprising at least one first leg which can rest on the ground and a second leg which can rotate with respect to said first leg about a main axis of rotation that passes through a common end, respective apparatuses for the synchronous movement of said scissor-like structures, each of said apparatuses being configured for the relative rotation of said legs about said main axis and for the consequent upward or downward movement of said platform, which is kept parallel to the ground, characterized in that each of said apparatuses comprises at least one linear actuator, which is supported by said platform and is configured for the movement of a kinematic system coupled to said legs, said kinematic system comprising at least:

a first auxiliary lever, articulated with a first end portion of it to said second leg and with a second end portion of it, opposite said first end portion, to a second auxiliary lever, articulated at the opposite end to a slider which can slide by virtue of the action of said actuator along a track which is integral with said platform, a first connecting lever, articulated with a first end portion of it to said first leg and with a second end portion of it, opposite said first end portion, to a second connecting lever, articulated at the opposite end to a sliding element, which can slide in a guiding slot provided along said slider.

2. The lift according to claim 1, comprising two of said platforms, kept at the same vertical elevation.

3. The lift according to claim 1, wherein each of said linear actuators comprises a cylinder which is anchored to said respective platform and a stem which can perform a relative translation with respect to said cylinder, adapted to move said slider.

4. The lift according to claim 3, wherein the cylinder is of a hydraulic type.

5. The lift according to claim 4, wherein the hydraulic cylinder of a first said actuator of one of said platforms is functionally associated, according to a master-slave logic, with said hydraulic cylinder of a first said actuator of the other of said platforms, and vice versa.

6. The lift according to claim 1, the track is constituted by an elongated slot provided along said respective platform.

7. The lift according to claim 1, wherein each of said actuators comprises a safety rack interposed between said stem and said respective slider.

8. The lift according to claim 1, comprising at least one auxiliary deck, which is supported by said platform and can move between a first inactive configuration, in which it lies on the supporting surface identified by said platform, and at least one second configuration, in which it is raised from said platform in a parallel arrangement.

9. The lift according to claim 8, comprising scissor-like means for lifting said deck, comprising a device for moving a pair of mutually articulated arms rotatably interposed between said platform and said deck.

10. A method for lifting vehicles using a platform configured to support a vehicle, comprising the following steps:

providing two scissor-like structures, for supporting said platform, each including a first leg, supportable on the ground, and a second leg, routable relative to the first leg around a main axis of rotation passing through a common end, providing, for each of the scissor-like structures, a respective synchronous movement system of the scissor-like structure, through said systems, relative rotation of the first and second leg around the main axis, and consequent movement upward or downward movement of said platform, so that the platform remains parallel to itself and to the ground, wherein it further comprises a step of movement of a kinematic system coupled to said legs though a linear actuator supported by the platform, wherein the kinematic system includes a first auxiliary lever, articulated with a first end portion to said first leg and with a second end portion, opposite to said first end portion, to a second auxiliary lever, the second auxiliary lever being articulated at the opposite end to a slider which can slide by means of that actuator along a track integral with said platform, a first connecting lever, articulated with a first end portion to said first leg and with a second end portion, opposite to said first end portion, to a second connecting lever, articulated at the opposite and to a sliding element, which can slide in a guiding slot provided along said slider.

11. The method according to claim 10, wherein each of said linear actuators comprises a hydraulic cylinder which is anchored to said respective platform and a stem which can perform a relative translation with respect to said cylinder, wherein the slider is moved through the movement of said stem.

12. The method according to claim 11, wherein each of said actuators comprises a safety rack interposed between said stem and said respective slider.

13. The method according to claim 11, wherein there are two of said platforms maintained at the same vertical height and wherein the hydraulic cylinder of said first actuator of one of said platforms is operatively associated, according to a master-slave logic, to said hydraulic cylinder of said first actuator of the other of said platforms.

14. The method according to claim 10, wherein an auxiliary deck is supported by said platform and can move between a first inactive configuration, in which it lies on the supporting surface identified by said platform, and at least one second configuration, in which it is raised from said platform.

15. The method according to claim 14, wherein the auxiliary deck is moved through a pair of mutually articulated arms, rotatably interposed between the platform and the deck.

* * * * *